US007509411B1

(12) United States Patent
Smith

(10) Patent No.: US 7,509,411 B1
(45) Date of Patent: Mar. 24, 2009

(54) SOCIAL ACCOUNTING SYSTEM IN TEXT DISCUSSION SYSTEM

(75) Inventor: Marc A. Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/483,469

(22) Filed: Jan. 14, 2000

(51) Int. Cl.
G06F 15/16 (2006.01)
G06F 15/173 (2006.01)

(52) U.S. Cl. ...................... 709/224; 709/205
(58) Field of Classification Search ............... 709/206, 709/203, 204, 200, 224, 205; 707/9, 3; 345/331, 345/700; 348/586; 715/513
See application file for complete search history.

(56) References Cited

U.S. PATENT DOCUMENTS

| 5,991,796 | A  | * | 11/1999 | Anupam et al. | 709/206 |
| 6,154,764 | A  | * | 11/2000 | Nitta et al. | 709/200 |
| 6,175,842 | B1 | * | 1/2001 | Kirk et al. | 715/513 |
| 6,212,548 | B1 | * | 4/2001 | DeSimone et al. | 709/204 |
| 6,219,045 | B1 | * | 4/2001 | Leahy et al. | 345/331 |
| 6,223,177 | B1 | * | 4/2001 | Tatham et al. | 707/9 |
| 6,288,753 | B1 | * | 9/2001 | DeNicola et al. | 348/586 |
| 6,438,564 | B1 | * | 8/2002 | Morton et al. | 715/500 |
| 6,463,460 | B1 | * | 10/2002 | Simonoff | 709/203 |
| 6,484,196 | B1 | * | 11/2002 | Maurille | 709/206 |
| 6,493,703 | B1 | * | 12/2002 | Knight et al. | 707/3 |
| 6,571,234 | B1 | * | 5/2003 | Knight et al. | 707/3 |
| 6,678,673 | B1 | * | 1/2004 | Eves et al. | 707/3 |
| 6,769,012 | B1 | * | 7/2004 | Liu et al. | 709/204 |
| 6,785,708 | B1 | * | 8/2004 | Busey et al. | 709/204 |
| 6,792,448 | B1 | * | 9/2004 | Smith | 709/204 |
| 2003/0179222 | A1 | * | 9/2003 | Noma et al. | 345/700 |

* cited by examiner

Primary Examiner—Jungwon Chang

(57) ABSTRACT

A real-time computer chat or discussion system includes a social accounting system that persistently maintains summary information regarding user participation in the chat system and displays the information at user computers as a social accounting pane. In one implementation, the social accounting pane is rendered simultaneously adjacent a discussion message pane in which discussion messages are rendered. The social accounting pane displays identifying information about each member of a discussion such as, for example, a user name and an email address. Members currently involved in or logged into the discussion are indicated with an attendance field. An entered field and an exit field indicate when each member last entered the discussion and, if not present, when the member last exited the discussion. The social accounting pane may also list a session field indicating the number of sessions or times each member has entered the discussion. Thread, question, answer and comment fields may indicate the numbers of thread, question, answer and comment messages the member has posted.

26 Claims, 5 Drawing Sheets

SOCIAL ACCOUNTING SYSTEM IN TEXT DISCUSSION SYSTEM

FIELD OF THE INVENTION

The present invention relates to real-time computer discussion or chat systems and, in particular, to such a system with a social accounting of user participation in such systems to provide users with contextual information about each other.

BACKGROUND AND SUMMARY OF THE INVENTION

Conventional real-time computer discussion or chat systems allow users at multiple separate user computers to communicate with each other substantially simultaneously in real-time. For example, each user is free to enter text messages or "turns" into the discussion system. A central computer system receives the messages or turns and broadcasts them to each of the user computers. The messages or turns are broadcast in the order in which the messages are received at the central computer system (i.e., a first in-first out system). The text messages are displayed on a display screen associated with each user computer as a common sequence and set of messages, thereby allowing all users to communicate with each other simultaneously.

In conventional prior art implementations, the messages or turns are generally non-persistent. Other than a relatively small number of the most recent messages or turns, the older turns in prior art systems scroll from the display and are no longer available to users. Typically, the messages received at a user computer during a first session of a discussion or chat are not again available to that user computer from the discussion system during a subsequent chat. Each user computer typically displays messages or turns that have been transmitted or broadcast only during a session in which the user computer is included in (e.g., logged into) the discussion or room. Messages or turns transmitted in the discussion before a user computer is included are unavailable to that user computer from the discussion system.

One disadvantage of conventional real-time computer chat systems in comparison to traditional direct verbal communication is that chat systems typically provide little or no social context for the participants in the discussion. Social context in traditional direct verbal communication assists people in discerning the suitability, usefulness, applicability, or veracity of statements made by other people. Social context may include knowledge of past statements of a person, including the frequency and types of statements.

While the general non-persistence of messages or turns in conventional real-time computer chat systems exacerbates the absence of social context information, persistence alone typically cannot provide the social context information. One aspect of conventional real-time computer chat systems is that generally large numbers of messages can be posted over different periods of time. Persistently maintaining all messages so that a user could review them and discern the types of information posted by each of the users would usually be impracticable because of the significant numbers of users and messages.

The present invention provides for real-time computer chat or discussion systems a social accounting system that persistently maintains summary information regarding user participation in the chat system and displays the information at user computers as a social accounting pane. In one implementation, the social accounting pane is rendered simultaneously adjacent a discussion message pane in which discussion messages are rendered. In other implementations, the social accounting pane and the discussion message pane could be arranged differently relative to each other in a simultaneous display or could be displayed or used separately.

In one implementation, the social accounting pane displays identifying information about each member of a discussion such as, for example, a user name and an email address. Members currently involved in or logged into the discussion are indicated with an attendance field. An entered field and an exit field indicate when each member last entered the discussion and, if not present, when the member last exited the discussion. The social accounting pane may also list a session field indicating the number of sessions or times each member has entered the discussion. Thread, question, answer and comment fields may indicate the numbers of thread, question, answer and comment messages the member has posted.

The social accounting pane can give each user contextual information about other users to assist each user in discerning which other users are likely to be contributing desired information to the discussion. Persistently maintaining the contextual information allows it to accumulate over multiple sessions. The summary form of the contextual information makes reference and access to it convenient and practicable.

It will be appreciated that the persistently maintained contextual or social information may be used with a conventional chat system in which the messages are generally non-persistent, or with a chat system that persistently maintains the messages. In the generally non-persistent former system, the persistently maintained contextual or social information provides the only persistent information relating to user participation. In the persistent latter system, the persistently maintained contextual or social information summarizes user participation that might otherwise require excessive user effort to obtain.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
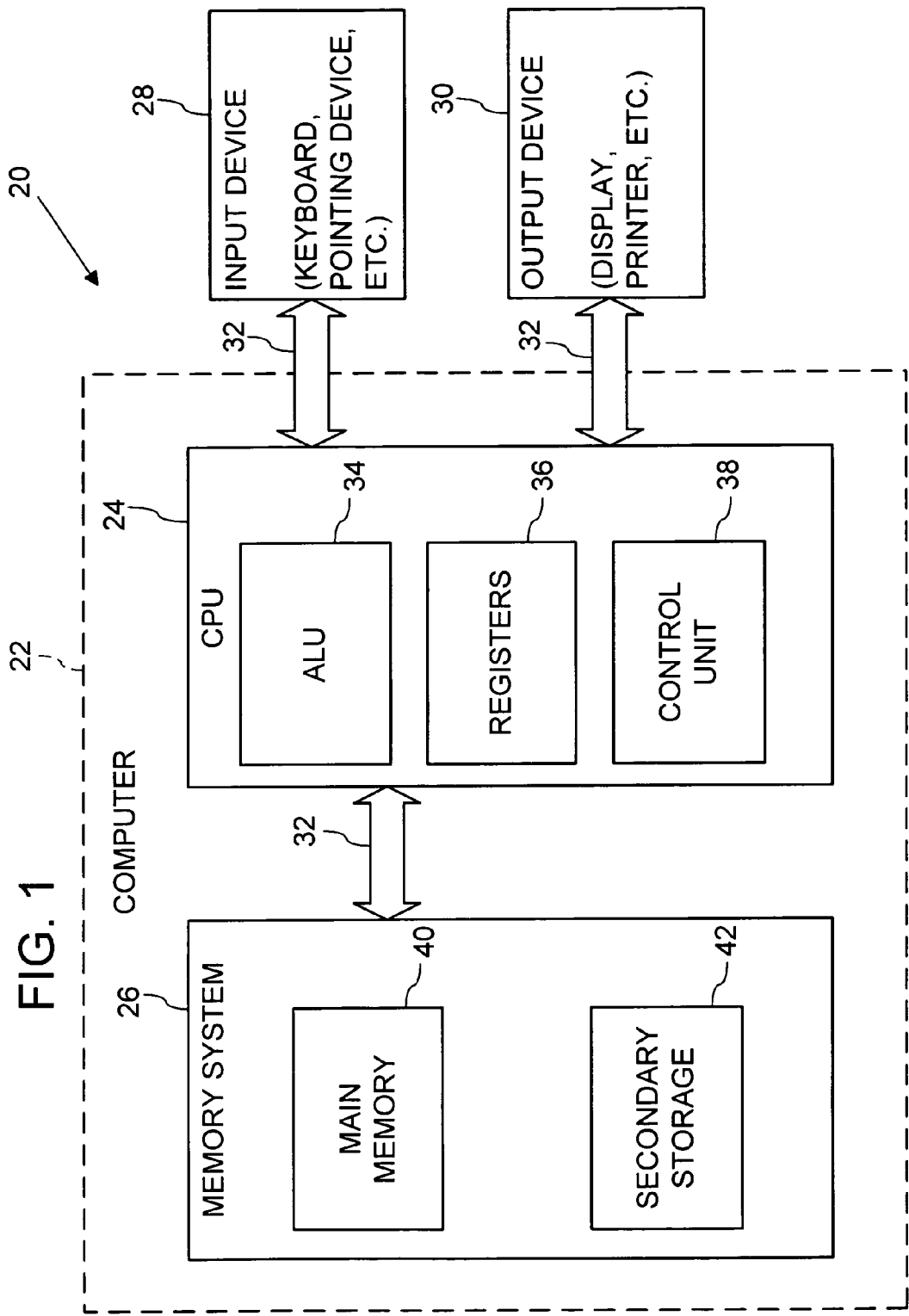
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semi-conductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
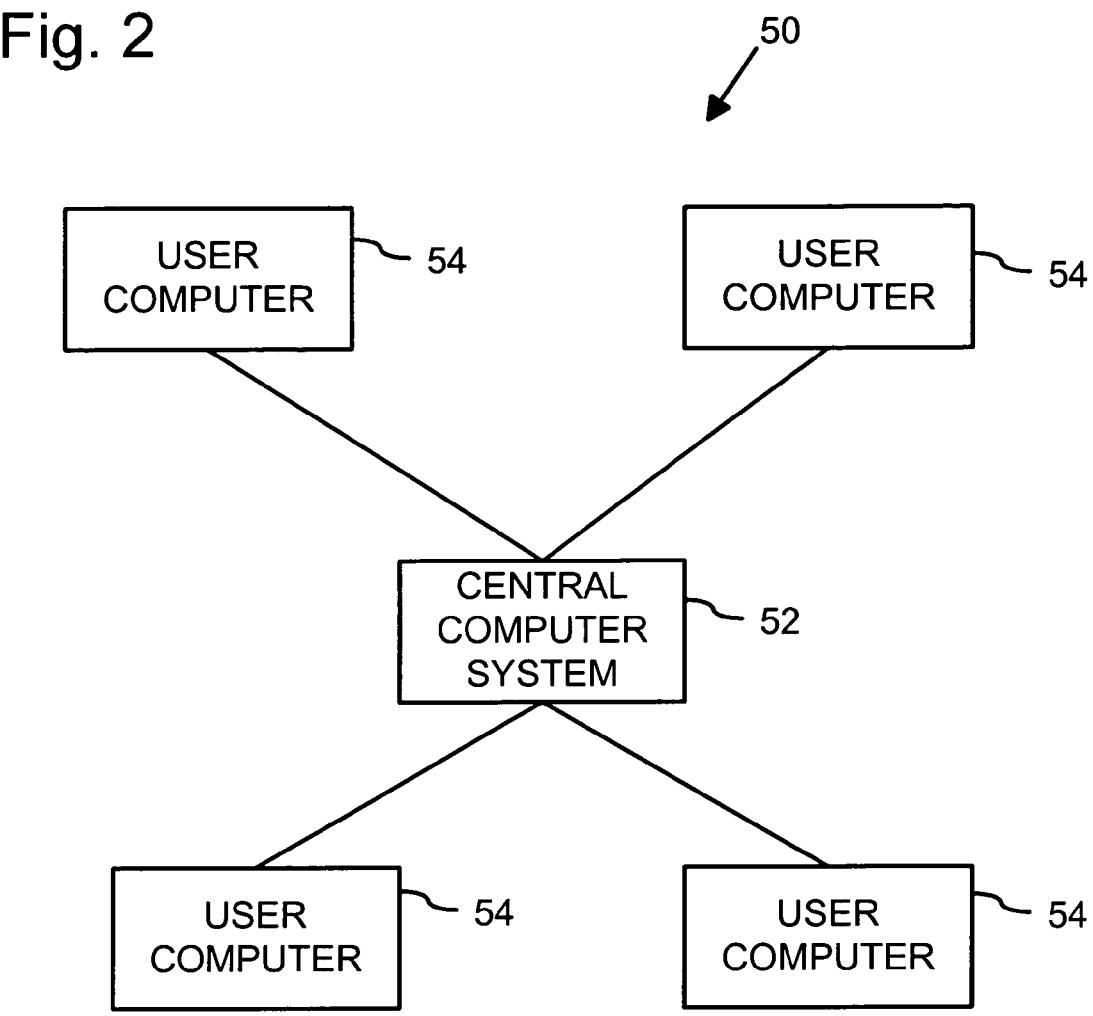
FIG. 2 is a diagram illustrating a real-time computer communication, chat, or discussion system.

FIG. 2 is a diagram illustrating a real-time computer communication, chat, or discussion system 50. Discussion system 50 includes a central computer system 52 in communication with which each of multiple user computers 54 that are each operated by a user. The group of users and user computers 54 that are in communication with each other may be referred to in a variety of ways. A common metaphor is to refer this group as being in a chat room, room, or discussion.

Commonly, central computer system 52 is a distributed system or interconnected central network of computers with which the multiple user computers 54 communicate over a computer network (e.g., the Internet). It will be appreciated, however, that discussion system 50 can be implemented in many different ways such as with central computer system 52 being a single computer, with user computers 54 communicating with central computer system 52 over a local network, etc.

Figure 3:
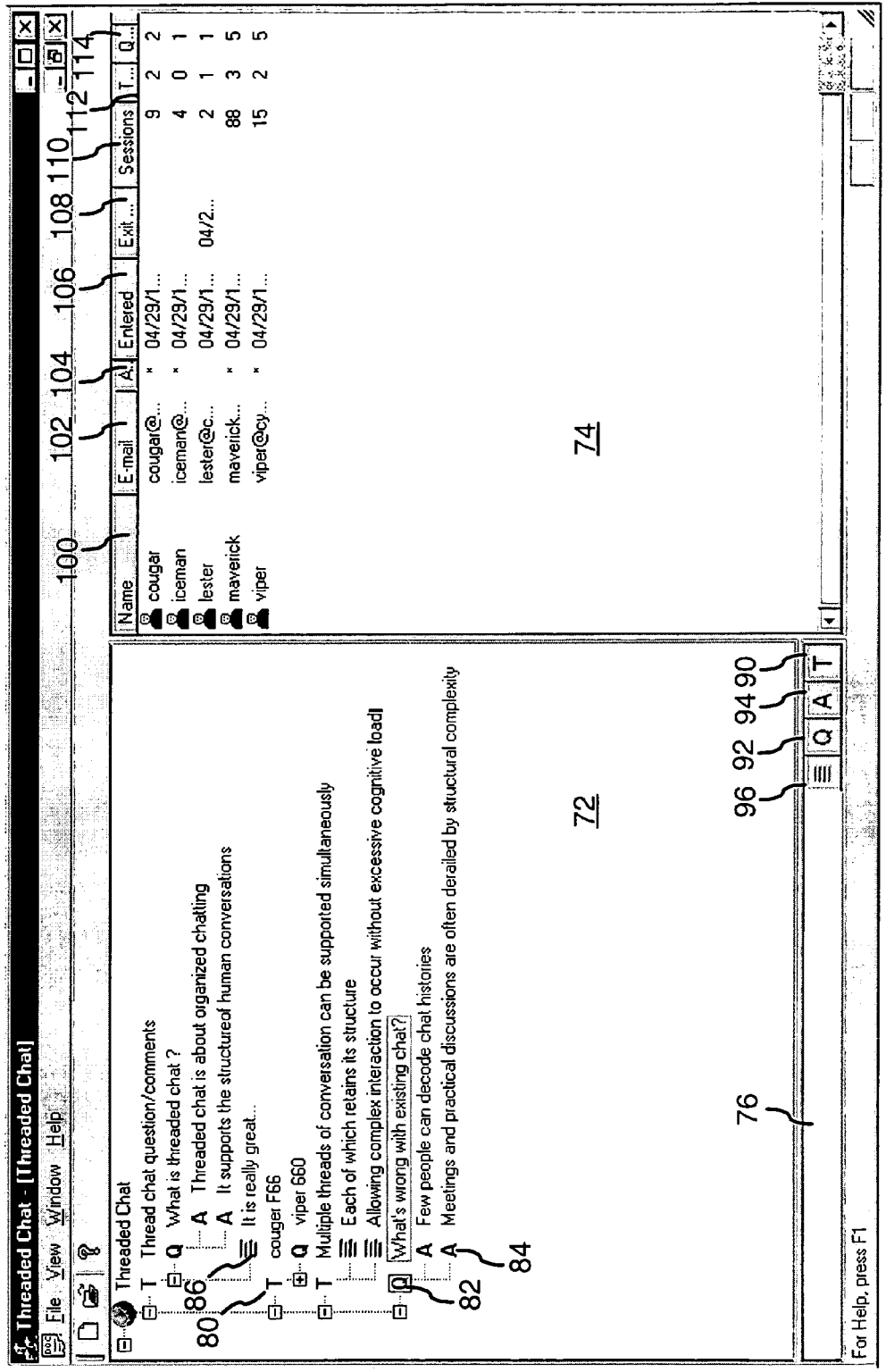
FIG. 3 is an illustration of a graphical user interface for a threaded text discussion system software client.

FIG. 3 is an illustration of a graphical user interface 70 for a threaded text discussion system software client. User interface 70 is rendered on display screens of user or client computers, such as user computers 54. User interface 70 includes a threaded discussion message pane 72 and a social accounting pane 74. In the illustration of FIG. 3, threaded discussion message pane 72 and social accounting pane 74 are rendered simultaneously adjacent each other on the display screen. It will be appreciated, however, that threaded discussion message pane 72 and social accounting pane 74 could be arranged differently relative to each other in a simultaneous display or could be displayed or used separately.

Within threaded discussion message pane 72, messages or turns are rendered or listed in a threaded or tree structure. The threading of related messages or turns may be performed manually by the user or automatically by discussion system 50 based upon a messaging heuristic, as described below in greater detail. Threaded discussion message pane 72 includes a text entry pane 76 within which users enter or type their turns or messages. Threaded messages are rendered within threaded discussion message pane 72 with message type indicators that provide a type indication for each message.

The implementation shown in FIG. 3 illustrates four message types and four corresponding message type indicators: a thread message type indicator 80 which indicates that a message is the start of a new thread, a question message type indicator 82 which indicates that a message is a question, an answer message type indicator 84 which indicates that a message is an answer, and a comment message type indicator 86 which is the default message indication and is non-specific about the message type.

In the illustrated implementation, message type indicators 80-86 are rendered according to which of respective graphical text input controls 90-96 are selected by the user to transmit to discussion system 50 text that is typed or otherwise entered into text entry pane 76. It will be appreciated, however, that message transmission and simultaneous message type indications could alternatively be made by a user with pre-defined keystrokes. For example, the keystrokes CTRL-T, CTRL-Q, CTRL-A and ENTER, or any other keystrokes, could simultaneously transmit a message to the discussion system and provide respective message type indicators 80-86.

Conventional prior art chat systems are directed to generally recreational uses. Commonly, users enter the chat room and from that time are provided a list of users in the room and the chat messages that are broadcast to the room. While such chat rooms are capable of supporting simultaneous recreational communication, they are poorly suited to collaborative discussions directed to a joint goal or task such as in a business or professional context. Threaded discussion message pane 72 resolves the dissociations and ambiguities between messages characteristic of conventional chat systems. Moreover, social accounting pane 74 further supports collaborative discussions directed to a joint goal or task by displaying persistent information about past and current members of a discussion.

Social accounting pane 74 displays identifying information about each member such as, for example, a user name 100 and an email address 102. Members currently involved in or logged into the discussion are indicated with an attendance indicator 104 (e.g., shown as asterisks in the illustrated implementation). An entered indicator 106 and an exit indicator 108 indicate when each member last entered the discussion and, if not present, when the member last exited the discussion. In the illustrated example, all listed users other than user "lester" are present in the discussion.

Social accounting pane 74 also lists a session indicator 110 indicating the number of sessions or times each member has entered the discussion and thread, question, answer and comment indicators (only thread indicator 112 and question indicator 114 are shown) indicating the numbers of thread, question, answer and comment messages the member has posted.

Social accounting pane 74 is implemented in part by a social accounting data structure within which data rendered in social accounting pane 74 are stored in a computer readable medium. The social accounting data structure includes a user identifying information field for identifying users who have participated in the discussion during any of the plural sessions. As shown in FIG. 3, user identifying information field may include both a user name and contact information such as an email address. It will be appreciated that either the user name or contact information could be used separately.

A participating user information field identifies users who are currently participating in the discussion. In this context, participation in the discussion refers to being logged into and receiving the substantially real-time messages in the discussion. Participation often includes, but does not require, that each user be transmitting messages.

A discussion entry information field identifies when (e.g., date and time) users most recently participated in or entered the discussion during any of the plural sessions. A discussion exit information field identifies when (e.g., date and time) users who are not currently participating in the discussion most recently stopped participating (e.g., logged out or signed off to end a session). A session participation information field indicates the number of sessions during which each user has participated in the discussion, typically including a current session if the user is currently participating in the discussion. As described above, some messages are designated as being certain message types (e.g., thread message type, a question message type, an answer message type, and a comment message type). A message type information field indicates the numbers of each message type provided to the discussion by each user.

Figure 4:
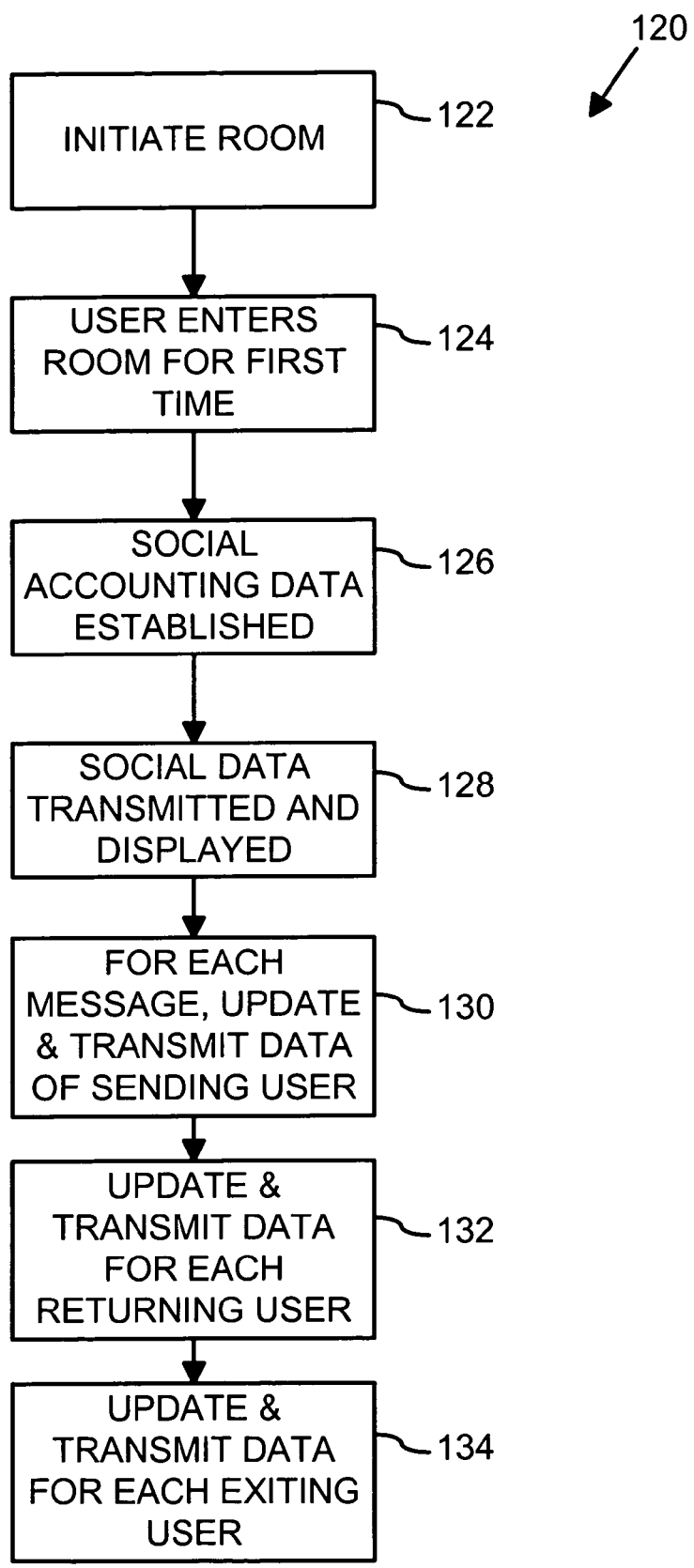
FIG. 4 is a flow diagram illustrating operation of a threaded discussion software process that in one implementation operates with the graphical user interface of FIG. 3.

FIG. 4 is a flow diagram illustrating operation of a social accounting software process 120 that operates with social accounting pane 74 of graphical user interface 70. Social accounting process 120 is performed by central computer system 52 and user computers 54 and is described with reference to a room operating on chat system 50 and accessible to multiple users operating multiple user computers 54.

Process 120 could be applied to a chat or discussion system with or without persistence of messages. It will be appreciated that operation of discussion system 50 will often entail generally simultaneous actions by different users. The following description of process 120 references various actions in a flow diagram, but the sequence of actions shown in FIG. 4 is exemplary and merely illustrates the different actions in the process. The sequence of many actions shown in FIG. 4 does not indicate a suggested or intended sequence of the actions.

Process block 122 indicates that the room is initiated in discussion system 50.

Process block 124 indicates that a user enters the room for a first time.

Process block 126 indicates that social accounting data are established for the user. The social accounting data include a user identifying information field that receives identifying information for the user and, for example, discussion entry information identifying when (e.g., date and time) the user entered the room. The social accounting data may also include initial or default values for other data fields such as discussion exit information (e.g., initial value null), session participation information (e.g., initial value 1 to reflect the first session), and message type information (e.g., initial value 0).

Process block 128 indicates that the social accounting data are transmitted to and displayed at the user computers in communication with discussion system 50.

Process block 130 indicates that for each message transmitted over discussion system 50, the social-accounting data for the user initiating the message are updated, transmitted to, and displayed at the user computers in communication with discussion system 50.

Process block 132 indicates that for each returning user who enters the room, the social accounting data for the returning user are updated, transmitted to, and displayed at the user computers in communication with discussion system 50.

Process block 134 indicates that for each user who exits the room, the social accounting data for the returning user are updated, transmitted to, and displayed at the user computers in communication with discussion system 50.

In one implementation, discussion system 50 stores the messages or turns so that they are generally persistent. All turns from all sessions of a discussion are available to each user during each session, even messages that are originally transmitted in the discussion when a user computer 54 is not included in the discussion. Such persistence for messages allows discussion system 50 to provide communication for collaborative work and to maintain a useful record of such communication.

In one implementation, messages in discussion system 50 include data that are structured with the following turn-structured quasi-synchronous discussion header data format:

Thread-Owner: UserID (Email/url)

Thread-Permissions: <READ: {World, Group, Me}>, <WRITE: {World, Group, Me}>, <EXECUTE: {World, Group, Me}>

Thread-Type: <Ballot>, <Binary>, <Rating>

Turn-Owner-(author): UserID (Email/url)

Turn-ID: <UserID (Email/url), Date, Time, Host>

Turn-Target: <ThreadBuffer>, <WhiteBoard>, <Application>

Turn-Type: <Thread>, <Question>, <Answer>, <Comment>, <Vote>,

<Binary>, <Rating>

Turn-URL: URL

Turn-Parents: <UserID (Email/url), Date, Time, Host>, <UserID (Email/url)Date, Time, Host>, etc.

Date and Time Initiated:

Date and Time Received:

Turn-Keywords: Machine selected

Content: HTML

These data fields are described as follows.

Thread-Owner: UserID (Email/url)—Threads are by default publicly writeable, but are owned by the initiator of the thread. By default, users own threads that are stored on their own web servers. Thread rights can be changed by the owner and delegated or even permanently transferred to other users or groups by use of Thread Permissions. Thread rights govern rights of access, addition, modification, and deletion to a thread and can be differentially granted to individuals, groups, or made public.

Thread-Permissions: <READ: {World, Group, Me}>, <WRITE: {World, Group, Me}>, <EXECUTE: {World, Group, Me}>—The Thread-Owner may separately assign different groups or individuals the rights to Write to a thread, read a thread or execute. As one example, some threads may be writable only by their authors. Once the author completes and enters the last message in the thread, the permissions may be opened to a group or the world.

Thread-Type: <Ballot>, <Binary>, <Rating>, <Invitation>—Threads of a default unspecified type can have any replies, as illustrated above in FIG. 3. Threads can alternatively have specialized forms that constrain replies. Some threads can restrict and preformat replies of other users. For example, "invitations" produce a set of user names linked to blank text fields, only the named users can reply in those locations (although an "other" field might be present as well). Specific individuals are thus explicitly identified as requested respondents. Ballot threads generate multiple choice objects that allow specified groups of users (or all) to contribute to a response. With Thread-Permissions and Thread-Types used together, both the respondents and the formats of their responses can be specified.

Turn-Owner-(author): UserID (Email/url)-Provides unique identification of each discussion system user according to a combination of email address and url/server address.

Turn-ID: <UserID (Email/url), Date, Time, Host>—Provides unique identification of each message according to a combination of email address and url/server address of the posting user, the date and time of the post, and an identification of the discussion system host.

Turn-Target: <ThreadBuffer>, <WhiteBoard>, <Application>—Each turn is addressed to a particular discussion device or helper application like a whiteboard. The default output target is the message threader that displays collapsible trees. The client communicates with any application or scripting language—exchanging messages between the discussion interface and independent applications which could also be network interaction media. A single user event might trigger an array of messages to different target applications. For example, updating the text buffer, opening a whiteboard, and instructing a keyword filter to add new terms and scan a new group of threads.

Turn-Type: <Thread>, <Question>, <Answer>, <Comment>, <Vote>, <Binary>, <Rating>

Turn-URL: This field provides a network address (e.g., URL) that is included in or referenced by a turn.

Turn-Parent: <UserID (Email/url), Date, Time, Host>, <UserID (Email/url)Date, Time, Host>, etc. Provides unique identification of the parent(s) of each message according to a combination of email address and url/server address of the posting user, the date and time of the parent post or posts. Parent posts are messages that a selected message is responding to or threaded from. A responsive message may be considered a direct reply to an immediate parent or an indirect reply to any higher-level parents.

Date and Time Initiated: Indicates the date and time at which a user begins entering a turn into, for example, text entry pane 76.

Date and Time Received: Indicates the date and time at which a Turn is received by the system host (e.g., central computer system 52).

Turn-Keywords: Machine selected

Content: HTML

Each message or turn may be addressed by a data structure in the following format:

/server/channel/thread group/thread/user/application/data

The server tag identifies the particular central computer system 52 that supports the chat or discussion. The channel tag identifies a particular group of chats or discussions on the central computer 52 with which the discussion is associated. The thread group tag identifies the particular discussion or chat. The thread tag identifies the particular thread to which the message or turn is posted. The user identifies the person who posts the message or turn. The application identifies the application, and the data tag includes the message to be posted.

Figure 5:
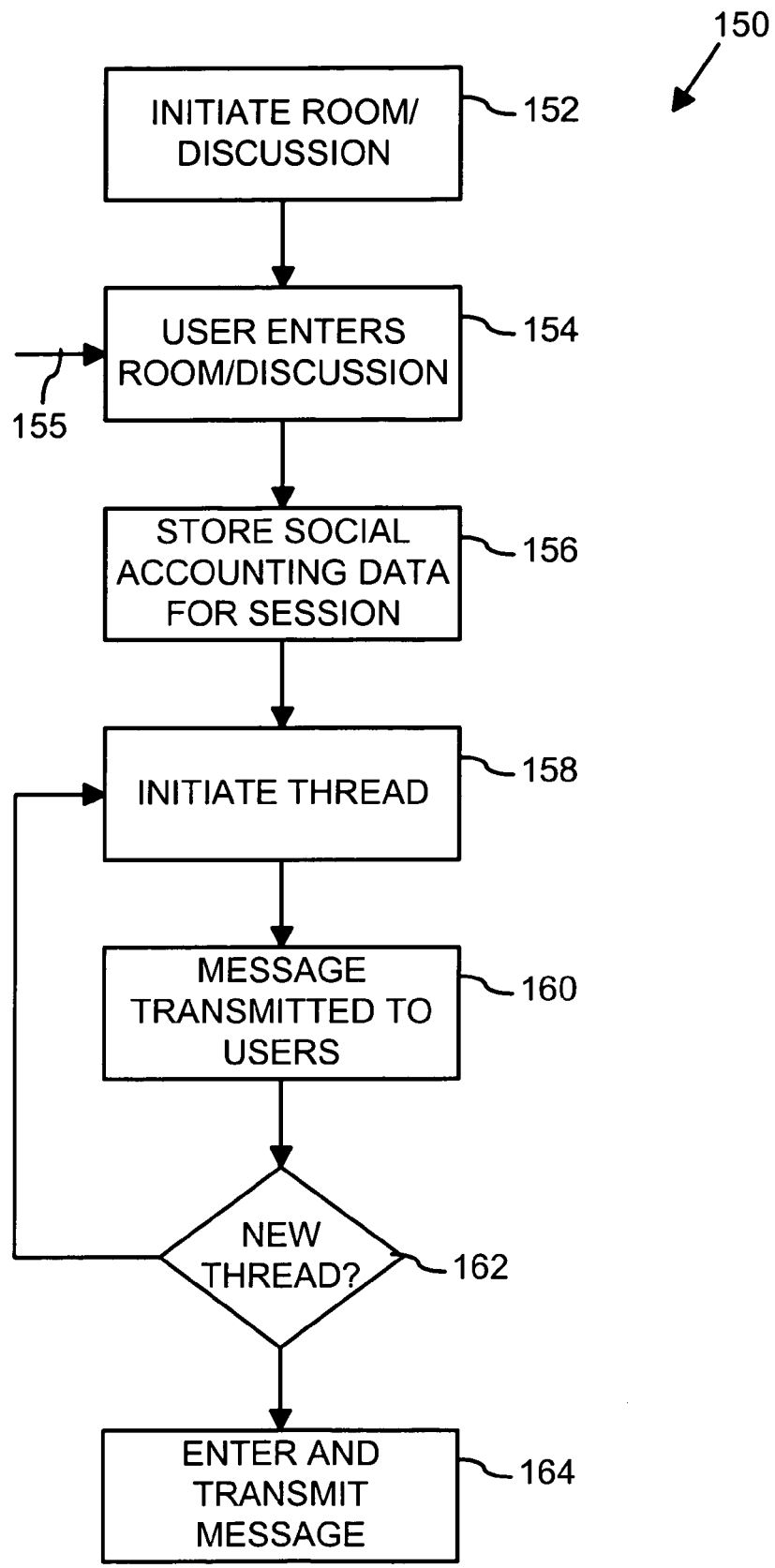
FIG. 5 is a flow diagram of an automatic context-based message threading process.

FIG. 5 is a flow diagram illustrating operation of a threaded discussion software process 150 that in one implementation operates with graphical user interface 70. Threaded discussion software process 150 is performed by central computer system 52 and user computers 54 and is described with reference to a persistent "room" or discussion operating on chat or discussion system 50 and accessible to multiple users operating multiple user computers 54. In such an implementation, process 150 would be suitable for use in a collaborative work with a relatively limited number of users. It will be appreciated that process 150 could alternatively be applied to a discussion system without persistence of messages.

Process block 152 indicates that a room or discussion is initiated. In one implementation, the room or discussion is initiated by a Room-Owner who has a UserID (Email/url). Rooms are by default publicly writeable and readable. Room rights can be changed by the owner and delegated or even permanently transferred to other users or groups by use of Room Permissions analogous to the Thread Permissions described above. Room rights govern rights of access and addition of messages to the room and can be differentially granted to individuals, groups, or made public.

Process block 154 indicates that a user logs into or enters the room or discussion. Entry into and participation in the room or discussion is subject to the user satisfying the Room Permissions. The time during which a user is in the room or discussion is referred to as a session. User interface 70, with threaded discussion message pane 72 and social accounting pane 74, is rendered on a display screen associated with the user's computer 54. As indicated by function flow arrow 155, users with suitable Room Permissions may directly access an existing room.

Process block 156 indicates that each session has associated with it one or more social accounting data fields that are persistently stored within system 50. The social accounting data fields may include one or more fields indicating for that user a Session Initiation Date and Time, a Session Termination Date and Time, a Session Count, and Message Type Counts for selected message types (e.g., threads, questions, answers, comments) that are updated during a session. These social accounting fields provide the data displayed to all users within social accounting pane 74 (FIG. 3).

Process block 158 indicates that a user initiates a thread by, for example, entering text into text entry pane 76 and transmitting the message to discussion system 50 by selecting text input control 90. In one implementation, threaded discussion software process 150 includes automatic context-based message threading and type indication. In this implementation, process 150 could automatically provide a thread identifier to a first thread in the discussion with the user selecting a generic input control (e.g., a RETURN or ENTER key) based upon the absence of any other turns or messages in the discussion. This automatic context-based message threading and type indication may also be applied in other contexts, as described below in greater detail.

The message or turn initiating the thread has associated with it one or more thread-related fields and one or more message- or turn-related fields that are persistently stored within system 50. The thread-related fields may indicate Thread-Owner, Thread-Permissions, and Thread-Type. The message- or turn-related fields may indicate Turn-Owner, Turn-ID, Turn-Target, Turn-Type, Date and Time Initiated, Date and Time Received, and Content, and optionally Turn-URL and Turn-Keywords. The Thread-Owner and Turn-Owner fields are established automatically by process 150 based upon the identity of the user whose message or turn initiates the thread.

The fields Turn-ID, Turn-Target, Date and Time Initiated, and Date and Time Received are established automatically by process 150 based upon the chat or discussion to which the turn is directed by the user and when the chat or discussion is initiated and received by the chat system. The field Content and optionally Turn-URL and Turn-Keywords are entered or indicated by the user. In another implementation, discussion system 50 can automatically identify predetermined terms in the Turn-Keywords field. With respect to process block 158, the fields Turn-Type and Turn-Parents are set according to the message or turn representing the start of a thread.

Thread-Permissions and Thread-Type may remain default values or may be selected by the user initiating the thread. In one implementation, selection of text input control 90 to transmit a thread initiating message causes a window or menu to be displayed listing user-selectable options for non-default values of Thread-Permissions and Thread-Type, or other user-selectable fields. The user initiating the thread selects any desired non-default values and accepts them, which results in the message being transmitted to discussion system 50.

For example, the user initiating the thread could select Thread-Permissions <READ: {Group}>, <WRITE: {Group}>, <EXECUTE: {Me}> and a Thread-Type of <Ballot> with several message choices specified. Such selections would allow a specified group to read the thread and write replies, but the replies could be only of the specified message choices.

Process block 160 indicates that the message or turn for the initiated thread is transmitted to and displayed at user computers 54 that are logged into the room or discussion.

Inquiry block 162 represents an inquiry as to whether the next message or turn received by discussion system 50 represents a new thread. Whenever the next message or turn received by discussion system 50 represents a new thread, inquiry block 160 returns to process block 158. Whenever the next message or turn received by discussion system 50 does not represent a new thread, inquiry block 162 proceeds to process block 164.

Process block 164 indicates that a user enters a message or turn that is included in an existing thread by, for example, entering text into text entry pane 76 and transmitting the message to the discussion system by selecting one of text input control 92-96. The user may manually indicate a previous turn from which the new turn is to be threaded by graphically selecting or indicating the previous turn in message pane 72, such as with a graphical input device like a mouse.

The new message or turn to be included in an existing thread has associated with it one or more thread-related fields and one or more message- or turn-related fields that are persistently stored within system 50. The thread-related fields may indicate Thread-Owner, Thread-Permissions, and Thread-Type. The message- or turn-related fields may indicate Turn-Owner, Turn-ID, Turn-Target, Turn-Type, Date and Time Initiated, Date and Time Received, and Content, and optionally Turn-URL and Turn-Keywords.

The Thread-Owner and Turn-Owner fields are established automatically by process 150 based upon the identity of the user whose message or turn initiates the thread, which may be obtained from the previous turn from which the new turn is to be threaded. The fields Turn-ID, Turn-Target, Date and Time Initiated, and Date and Time Received are established automatically by process 150 based upon the chat or discussion to which the turn is directed by the user and when the turn or message is initiated and received by the chat system. The field Content and optionally Turn-URL and Turn-Keywords are entered or indicated by the user. in another implementation, discussion system 50 can automatically identify predetermined terms in the Turn-Keywords field. The field Turn-Type is set according to the message or turn representing the start of a thread, and the field Turn-Parents is set according to which of the messages in the thread are parents to other messages.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. A method of providing summary social context in a computer discussion system where multiple user computers are in communication such that a common sequence and set of messages are transmitted among the multiple user computers, the method comprising:

providing a communication discussion between the multiple user computers, users of the multiple user computers participating in a first session during the communication discussion;

associating first discussion information of the communication discussion with identifying information of a first user, the first user being within the users;

based on the first discussion information, generating a summary of participation for the first user, the summary of participation including the identifying information of the first user associated with a number of times the first user has entered the discussion; and providing, to the multiple user computers, the summary of participation of the first user, the summary of participation being displayed in a social accounting pane.

2. The method of claim 1, further comprising associating a current attendance status with the identifying information of the first user, wherein generating a summary of participation for the first user includes associating an attendance indicator with the identifying information of the first user.

3. The method of claim 2, wherein first discussion information includes associating a time exited with the identifying information of the first user each time that the first user exits the discussion, and wherein generating the summary of participation includes determining when the first user last exited the discussion if the current attendance status indicates not present.

4. The method of claim 3, wherein associating first discussion information includes associating a time entered with the identifying information of the first user each time that the first user enters the discussion, and wherein generating the summary of participation includes determining when the first user last entered the discussion if the current attendance status indicates present.

5. The method of claim 1, further comprising counting a number of messages of a first type posted by the first user in the first session, wherein generating the summary of participation includes associating the identifying information of the first user with the number of messages of the first type and an indicator of the first type.

6. The method of claim 5, wherein the first type is a member of a group consisting of a thread message type, a question message type, an answer message type, and a comment message type.

7. The method of claim 5, further comprising counting a number of messages of a second type posted by the first user in the discussion, the second type being different from the first type, wherein generating the summary of participation includes associating the identifying information of the first user with the number of messages of the second type and an indicator of the second type.

8. The method of claim 5, further comprising:
receiving an indication of posting of a message of the first type by the first user;
in response to receiving the message, transmitting the message to each of the multiple user computers;
in response to receiving the message, generating a new summary of participation of the first user; and
providing the new summary of participation of the first user to each of the multiple user computers.

9. The method of claim 1, further comprising:
providing a second session, in the discussion, between a portion of the multiple user computers;
wherein associating first discussion information with identifying information of the first user includes associating discussion information of the first user from the first and second sessions.

10. The method of claim 9, wherein the second session occurs prior to the first session, and wherein generating a summary of participation of the first user includes retrieving the second session information from a social accounting data structure.

11. The method of claim 1, wherein the social accounting pane is to be displayed simultaneously with a threaded discussion message pane displaying a plurality of messages in the discussion.

12. The method of claim 11, wherein the social account pane is to be displayed adjacent to the threaded discussion message pane.

13. The method of claim 1, wherein associating first discussion information with identifying information, generating a summary participation, and providing the summary of participation is repeated for each user of the multiple user computers.

14. A computer readable storage media containing computer executable instructions, that when performed, perform a method of providing summary social context in a computer discussion system where multiple user computers are in communication such that a common sequence and set of messages are transmitted among the multiple user computers, the method comprising:
providing a communication discussion between the multiple user computers, users of the multiple user computers participating in a first session during the communication discussion;
associating first discussion information of the communication discussion with identifying information of a first user, the first user being within the users;
based on the first discussion information, generating a summary of participation for the first user, the summary of participation including the identifying information of the first user associated with a number of times the first user has entered the discussion; and
providing, to the multiple user computers, the summary of participation of the first user, the summary of participation being displayed in a social accounting pane.

15. The computer readable storage media of claim 14, further comprising associating a current attendance status with the identifying information of the first user, wherein generating a summary of participation for the first user includes associating an attendance indicator with the identifying information of the first user.

16. The computer readable storage media of claim 15, wherein first discussion information includes associating a time exited with the identifying information of the first user each time that the first user exits the discussion, and wherein generating the summary of participation includes determining when the first user last exited the discussion if the current attendance status indicates not present.

17. The computer readable storage media of claim 16, wherein associating first discussion information includes associating a time entered with the identifying information of the first user each time that the first user enters the discussion, and wherein generating the summary of participation includes determining when the first user last entered the discussion if the current attendance status indicates present.

18. The computer readable storage media of claim 14, further comprising counting a number of messages of a first type posted by the first user in the first session, wherein generating the summary of participation includes associating the identifying information of the first user with the number of messages of the first type and an indicator of the first type.

19. The computer readable storage media of claim 18, wherein the first type is a member of a group consisting of a thread message type, a question message type, an answer message type, and a comment message type.

20. The computer readable storage media of claim 18, further comprising counting a number of messages of a second type posted by the first user in the discussion, the second type being different from the first type, wherein generating the summary of participation includes associating the identifying information of the first user with the number of messages of the second type and an indicator of the second type.

21. The computer readable storage media of claim 18, further comprising:
receiving an indication of posting of a message of the first type by the first user;
in response to receiving the message, transmitting the message to each of the multiple user computers;
in response to receiving the message, generating a new summary of participation of the first user; and providing the new summary of participation of the first user to each of the multiple user computers.

22. The computer readable storage media of claim 14, further comprising:
   providing a second session, in the discussion, between a portion of the multiple user computers;
   wherein associating first discussion information with identifying information of the first user includes associating discussion information of the first user from the first and second sessions.

23. The computer readable storage media of claim 22, wherein the second session occurs prior to the first session, and wherein generating a summary of participation of the first user includes retrieving the second session information from a social accounting data structure.

24. The computer readable storage media of claim 14, wherein the social accounting pane is to be displayed simultaneously with a threaded discussion message pane displaying a plurality of messages in the discussion.

25. The computer readable storage media of claim 24, wherein the social account pane is to be displayed adjacent to the threaded discussion message pane.

26. The computer readable storage media of claim 14, wherein associating first discussion information with identifying information, generating a summary participation, and providing the summary of participation is repeated for each user of the multiple user computers.

* * * * *